United States Patent
Brzostowski

[19]

[11] Patent Number: 5,930,731
[45] Date of Patent: Jul. 27, 1999

[54] METHOD AND SYSTEM FOR ACQUISITION AND PROCESSING OF MARINE SEISMIC DATA

[75] Inventor: Matthew A. Brzostowski, Houston, Tex.

[73] Assignee: PGS Tensor, Inc., Houston, Tex.

[21] Appl. No.: 08/794,292

[22] Filed: Feb. 3, 1997

[51] Int. Cl.⁶ .................................................. G10K 11/00
[52] U.S. Cl. .................................. 702/18; 702/6; 702/14; 702/16
[58] Field of Search ................................ 702/2, 6, 14, 16, 702/18; 367/14, 15; 73/649, 170.31, 170.33

[56] References Cited

U.S. PATENT DOCUMENTS

| | | | |
|---|---|---|---|
| 5,349,527 | 9/1994 | Pieprzak et al. | 362/421 |
| 5,586,026 | 12/1996 | Highnam et al. | 364/421 |

OTHER PUBLICATIONS

Residual migration: Rothman, Levin & Rocca: Jan. 1985: P 110–126; Gephysics.

Residual migration: Rocca, Politecnico & Salvador, AGIP S.p.A., Italy.

Practiall Parallel Geophysical Processing: Perkins, Zoll & Brzostowski; PGS Tensor.

Cascade f–k migration: Beasley, Lynn, Larner & Nguyen: Jul. 1988; P 881–893, Geophysics.

Modified Residual Migration: Beasley & Klotz: Western Atlas International, Singapore.

Cascade migrations: Larner & Beasley: May 1987; P 618–643, Geophysics.

*Primary Examiner*—Thomas R. Peeso
*Attorney, Agent, or Firm*—Gordon T. Arnold

[57] ABSTRACT

It has been found that, rather than merely recording raw data on the seismic vessel for processing on shore, the performance of certain processing on the vessel at a particular time addresses the problems. Specifically, performing pre-stack time migration on raw data as it is being recorded on a seismic ship provides the information needed for quality control of the acquisition process, as well as providing a starting point for velocity analysis in preparation for later depth migration.

50 Claims, 2 Drawing Sheets

METHOD AND SYSTEM FOR ACQUISITION AND PROCESSING OF MARINE SEISMIC DATA

BACKGROUND OF THE INVENTION

This invention relates to marine seismic data acquisition and processing and more particularly to three dimensional processing.

In acquiring three dimensional marine seismic data, equipment problems and noise can cause unacceptable data to be received at locations along a seismic survey. If this unacceptable data is not detected, serious quality problems in the processed data will occur. Since many of the problems that occur during seismic data acquisition are not detected until after the data is transported to a land-based processing center and the seismic recording vessel has left the survey area, returning to re-acquire the data is very time-consuming and expensive. Accordingly, there is a need to detect errors in the data as it is being acquired.

Many of the problems cannot be detected until the raw data received from the seismic receivers is migrated or imaged. As conducted currently and in the past, this is a very time-intensive process. Much discussion among those published in the area revolves around dealing with the inaccuracy of using time migration and the need to perform accurate velocity analysis in order to have well-imaged data.

Velocity analysis is known to be a time consuming iterative process, requiring some months of work to perform. As noted, the velocity analysis requires a starting assumption for the work, which is revised after the person conducting the velocity analysis sees a set of migrated data. This need to see migrated data before being able to conduct proper velocity analysis makes the iterative process quite long.

Additionally, interpretation of data, independent of velocity analysis and depth migration, currently must wait for depth migration. Since the time from acquisition to fully migrated data is about three to four months, the seismic data is not available in time to modify drilling or production activities in the acquisition area.

Accordingly, there is a need for a more real-time method of reviewing the quality of data and to reduce the number of iterations needed in velocity analysis before performing depth migration, as well as to provide a real-time interpretation tool for drilling and field management.

SUMMARY OF THE INVENTION

It is the object of the present invention to address the above-described needs. It has been found that, rather than merely recording raw data on the seismic vessel for processing on shore, the performance of certain processing on the vessel at a particular time addresses the problems. Specifically, performing pre-stack time migration on raw data as it is being recorded on a seismic ship provides the information needed for quality control of the acquisition process, as well as providing a starting point for velocity analysis in preparation for later depth migration.

In one aspect of the invention, a method is provided for processing marine 3D seismic data. This method comprises:

receiving data on a seismic recording vessel, whereby a set of received data is defined;

applying time migration to the received data on the seismic recording vessel, whereby a time-migrated set of data is defined;

recording the received data on the seismic recording vessel; and recording the time-migrated data on the seismic recording vessel.

According to a further aspect of the invention, a method for acquiring marine seismic data is provided comprising:

receiving data on a seismic recording vessel, whereby a set of received data is defined, applying time migration to the received data on the seismic recording vessel, whereby a time-migrated set of data is defined; and detecting an unacceptable portion of the time-migrated data.

According to a further aspect of the invention, a system is provided for processing marine 3D seismic data, wherein the system comprises:

means for receiving data on a seismic recording vessel, whereby a set of received data is defined;

means for applying time migration to the received data on the seismic recording vessel, whereby a time-migrated set of data is defined;

means for recording the received data on the seismic recording vessel; and means for recording the time-migrated data on the seismic recording vessel.

According to still a further aspect of the present invention, a system is provided for acquiring marine seismic data comprising:

means for receiving data on a seismic recording vessel, whereby a set of received data is defined;

means for applying time migration to the received data on the seismic recording vessel, whereby a time-migrated set of data is defined; and means for detecting an unacceptable portion of the time-migrated data.

According to an even further aspect of the present invention, a system for processing marine 3D seismic data, is provided, the system comprising:

a recording unit on a seismic recording vessel connected to a cable, the cable including seismic receivers, whereby a set of received data is defined;

a computer for applying time migration to the received data on the seismic recording vessel, whereby a time-migrated set of data is defined;

memory for storing the received data on the seismic recording vessel, and memory for recording the time-migrated data on the seismic recording vessel.

According to still a further aspect of the invention, there is provided a system for acquiring marine seismic data comprising:

a recording unit on a seismic recording vessel connected to a cable, the cable including seismic receivers, whereby a set of received data is defined;

a computer for applying time migration to the received data on the seismic recording vessel, whereby a time-migrated set of data is defined;

a detector of an unacceptable portion of the time-migrated data.

Further aspects and embodiments of the invention will occur to those of skill in the art which do not depart from the spirit of the invention.

BRIEF DESCRIPTION OF THE DRAWINGS

For a more complete understanding of the present invention and for further advantages thereof, reference is made to the following Description of Example Embodiments of the Invention taken in conjunction with the accompanying drawings, in which.

It is to be noted, however, that the appended drawings illustrate only example embodiments of this invention and are therefore not to be considered limiting of its scope, for the invention may admit to other equally effective embodiments.

DESCRIPTION OF EXAMPLE EMBODIMENTS OF THE INVENTION

Figure 1:
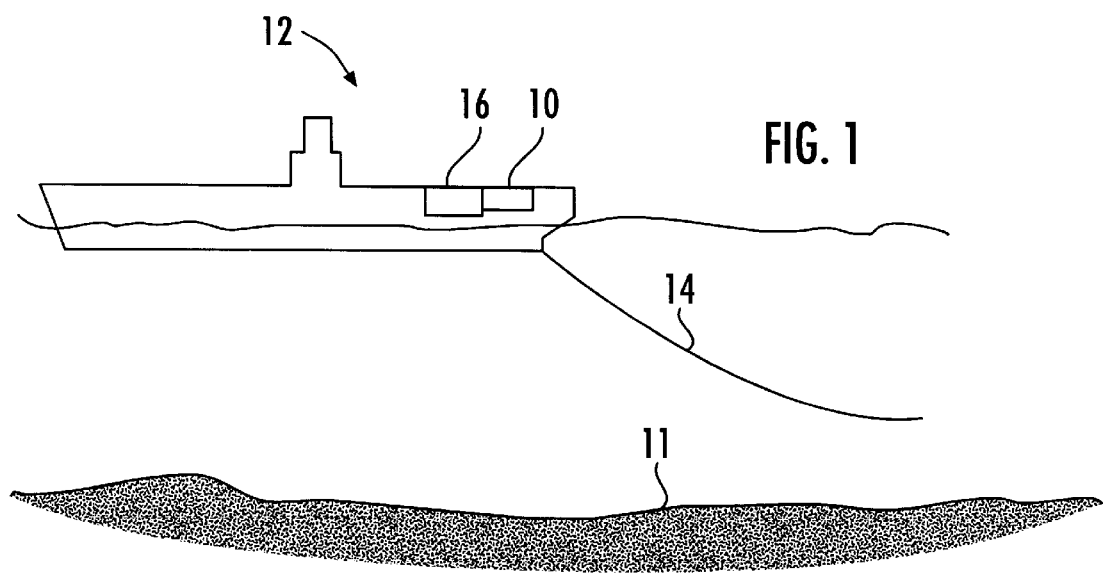
FIG. 1 is a side view of an embodiment of the invention.

Referring now to FIG. 1 (not to scale), a recording unit 10 on a seismic recording vessel 12 is seen, wherein the recording unit 10 is connected to a cable 14 (in this case a streamer, although the invention also applies to ocean bottom cables and other marine receiver cables that will occur to those of skill in the art). The cable 14 includes seismic receivers (not shown) which comprise, for example, hydrophones (e.g. in embodiments using towable streamers) and/or geophones (e.g. in ocean bottom cables). In some embodiments, the cable 14 includes multiple receivers at each receiver location, and in other embodiments, only one receiver is located at each receiver location. The present invention, in its broadest definition, is not therefore limited by the type of marine cable used. Further, those of skill in the art will understand that multiple cables 14 are used in most embodiments, which detect reflections and refractions from the earth 11. Only one is shown for simplicity.

The recording unit 10 receives signals from the receivers for use by the rest of the system. Examples of acceptable recording units are made by Syntron Recording Systems and Input-Output, Inc. and are known to those of skill in the art. Other acceptable recording units will also occur to those of skill in the art. Again, the present invention is not limited in its broadest definition by the type of recording unit used. In some embodiments, recording unit 10 records the data to tape, and the tape is then removed and input into computer 16. In other embodiments, the computer 16 receives the data directly from recording unit 10 as the recording unit 10 is recording to tape. While these two embodiments are the ones most feasible commercially at the present time, according to still another embodiment, computer 16 would receive the data independently of recording unit 10.

Also seen in FIG. 1 is a computer 16 for applying time migration to the received data on the seismic recording vessel, whereby a time-migrated set of data is defined. The computer includes sufficient memory 21 (FIG. 2) for storing the received data on the seismic recording vessel; and sufficient memory 23 for storing the time-migrated data on the seismic recording vessel.

Figure 2:
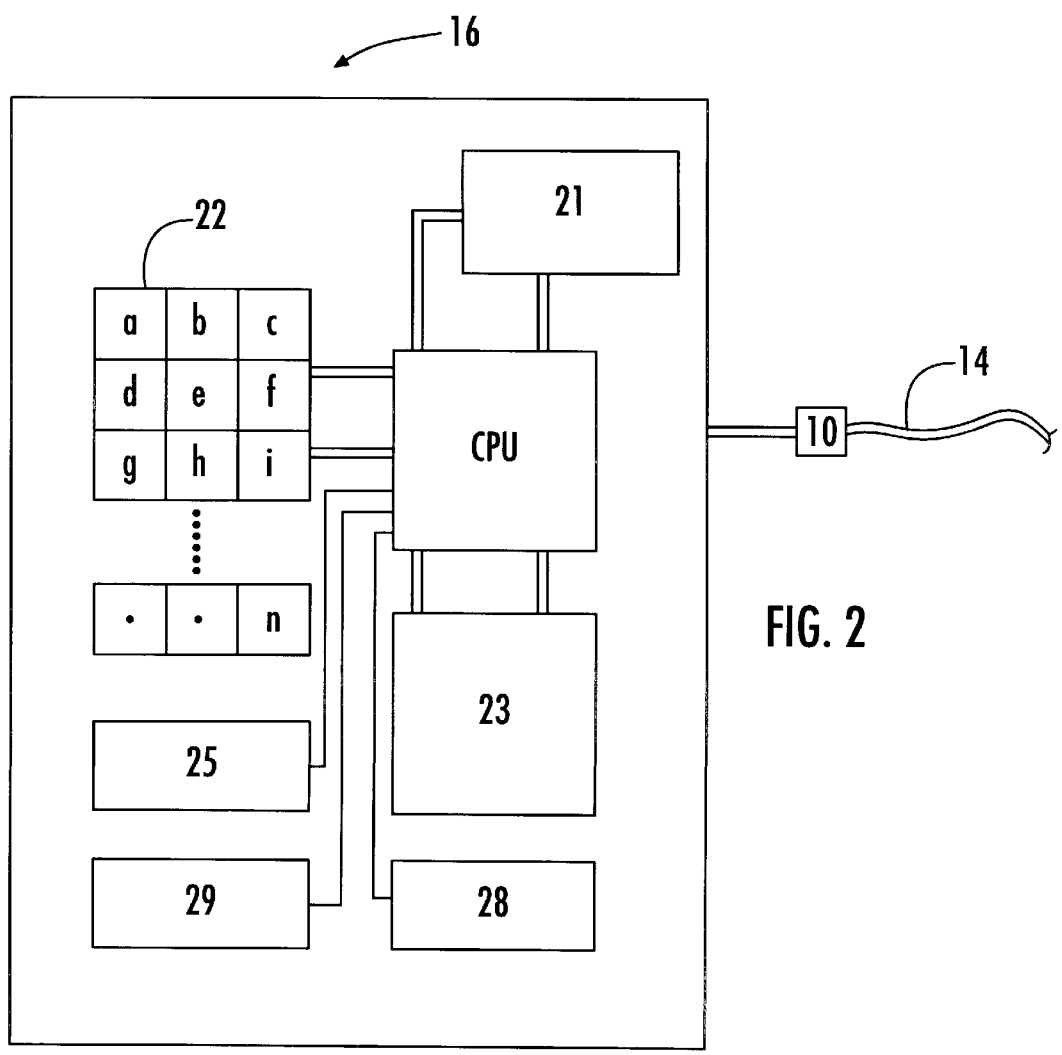
FIG. 2 is a view of an example of a computer architecture useful according to an embodiment of the invention.

Referring still to FIG. 2, according to one embodiment of the invention, the received data from cable 14 is stored in memory 21 while the time migration is being applied to the data to generate the time-migrated set of data. In some embodiments, the memory for storing the received data and the time-migrated data comprises a non-volatile memory (e.g., a hard drive). In other embodiments, it comprises volatile memory, the contents of which is written to some form of non-volatile memory after processing.

Examples of acceptable computers include: MPP (Massively Parallel Processing) machines, for example, the IBM SP2, Intel Paragon, Silicon Graphics Power Challenge, and others that will occur to those of ordinary skill. Other types of computers (e.g. special purpose computers), which are also acceptable, will occur to those of ordinary skill. These other types do not depart from the spirit of the invention.

In a more specific embodiment, an MPP system is used, running PGS CUBE MANAGER™ software. Other seismic migration software with migration algorithms are also acceptable. As with the cable and recording unit, the present invention is not limited in its broadest definition by the type of computer or software.

According to a further embodiment of the invention, the computer 16 applies the time-migration by application of a migration factor "a" from a stored table 22 to the received data. The migrated data is then stored in memory 23. In some embodiments of the invention, the stored table 22 represents f–k migration factors a–n and mapping relationships for mapping one location to another as will be understood by those of skill in the art. In other embodiments, the factors a–n represent Kirchhoff summation factors. The number of factors to be applied and the number of dimensions of the factors are dependent upon the type of time migration applied, as will be understood by a person of skill in the art upon review of this disclosure.

According to some embodiments of the invention, the computer 16 applies single pass migration, while, according to other embodiments, the computer applies multiple pass migration. In general, the type of time migration applied is not considered important to the invention, as different time migration methods will be appropriate in different situations, as will occur to those of skill in the art after review of this disclosure. However, in general, it is preferred that the following migration methods be used under the following conditions:

| Kirchhoff | Variable geometries |
| --- | --- |
|  | Variable water depth |
|  | Variable horizontal velocity |
| Stolt f–k | Regular geometry |
|  | Invariant horizontal velocity |

Further, it has been found that migration through use of a single velocity factor, known to be less than the velocity at a depth of interest, will result in images sufficient for quality control review during acquisition, while supplying a good first approximation for later depth migration and velocity analysis. Therefore, according to a further embodiment of the invention, the computer 16 applies the time migration by application of a factor from a stored table 25 to the data, with a water velocity. According to an alternative embodiment, the near surface velocity (defined as anything less than actual sediments, but greater than the water velocity) is used.

Referring still to FIG. 2, a detector 28 is seen for aid in quality control of the data acquisition. According to this embodiment of the invention, the detector 28 detects the occurrence and location of unacceptable portions of the time-migrated data (e.g. from a bad shot, swell noise, interference from other sources in the area, etc.).

Figure 3:
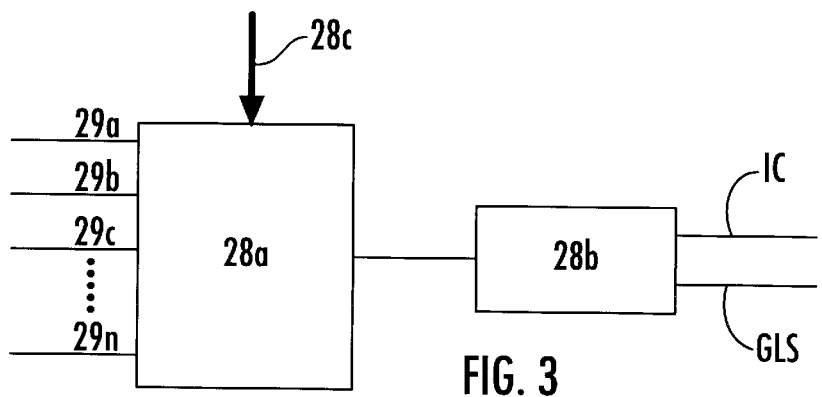
FIG. 3 is a view of an example of a computer architecture useful according to an embodiment of the invention.

According to one embodiment, (seen in FIG. 3) detector 28 comprises a comparator 28a of the data (seen as input bus 28c) to a set of attribute parameters 29a–29n stored in the computer memory section 29 (FIG. 2). Referring again to FIG. 3, the detector 28 further comprises a marker 28b of portions of the data outside of the attribute parameters 29a–29n. Examples of attribute parameters stored in memory section 29 include amplitude, residual moveout on the gather, water depth reflector fold and in-fill requirements, offset azimuth coverage, and illumination coverage. Further, marker 28b, according to one embodiment, returns (1) an identification code IC of the cable from which the unacceptable data was received (in many embodiments, multiple cables will be used) and (2) a geographic location signal GLS of the vessel (e.g. a GPS signal) at the time the shot from which the unacceptable data originated was initiated. These data are provided to marker 28b from the vessel's traditional navigation and recording systems (not shown) as will occur to those of skill in the art.

Figure 4:
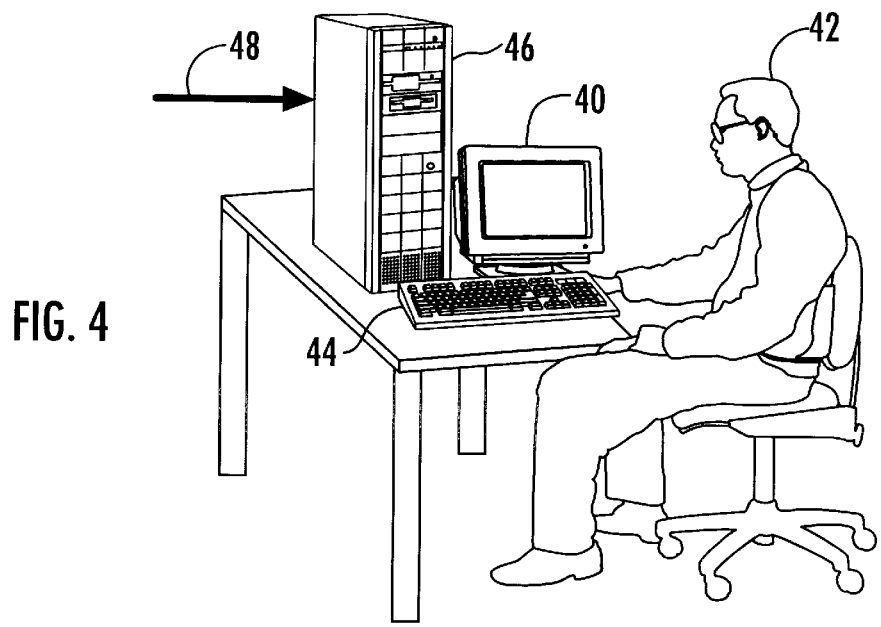
FIG. 4 is a view of an observer station useful according to an embodiment of the invention.

According to an alternative embodiment of the invention, seen in FIG. 4, as the data is received and migrated, the migrated data is displayed on a display 40, and observed by observer 42. In the event observer 42 determines that unacceptable data has been acquired, based on the observer's judgment, input device 44 (e.g. a keyboard connected to computer 46, which is displaying the migrated data and keeping a record of the identity of the cables and the vessel position associated with the displayed information) is used to input a signal for identification of the unacceptable data.

According to some embodiments of the invention, computer 46, used for marking the cable and geographic location of the unacceptable data, comprises the same computer 16 of FIG. 2. According to an alternative embodiment, computer 46 is separate, receiving migrated data from buss 48. Buss 48 is connected, in alternative embodiments, to read the migrated data from memory 23 or directly from the CPU of computer 16 as the data is being recorded in memory 28.

It should be noted that the embodiment shown in the above-described figures that the computer architecture shown is given by way of example, only, and any architecture and CPU structure, whether single CPU, parallel processing, or other multiple processors, which allows for the data flow and storage described is considered to be an equivalent.

Detection of unacceptable data while acquisition is occurring allows the vessel to return to the position where the unacceptable data occurred and re-acquire the data before leaving the area, unlike in the earlier practice when the existence of unacceptable data was not detected until perhaps moths after the acquisition.

Figure 5:
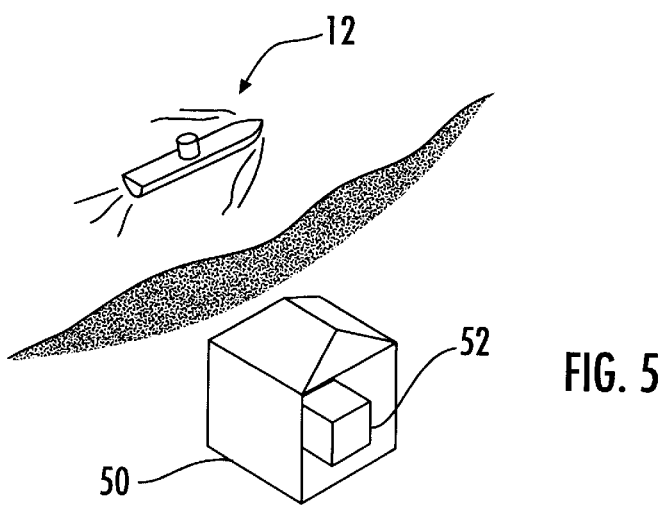
FIG. 5 is a view of an on-shore processing station useful according to an embodiment of the invention.

According to a further aspect of the invention, a method of processing seismic data is provided, wherein the time migration discussed above is followed by stacking and depth migration. Depth migration requires velocity analysis, which is a very time consuming, iterative process, as discussed above. With the initial time migration described herein, using the velocity assumptions discussed above, the depth migration process is considerably shorter. This results from the fact that after the initial time migration described above, all that is required is the residual velocity analysis and residual migration. In one such embodiment, the time-migrated data is removed from the vessel 12 and transported to a processing location 50, as seen in FIG. 5, including another computer 52 for applying the more computationally intense processing needed to produce a seismic section for interpretation. Here, the depth migration and velocity analysis is performed, using the information gathered from the time migration carried out on the vessel.

Further processing will occur to those of skill in the art which will not depart from the spirit of the present invention.

Finally, further aspects and embodiments of the invention will occur to those of skill in the art which do not depart from the spirit of the invention.

What is claimed is:

1. A method for processing marine 3D seismic data, the method comprising:

receiving data on a seismic recording vessel, whereby a set of received data is defined;

applying time migration to the received data on the seismic recording vessel, whereby a time-migrated set of data is defined;

recording the received data on the seismic recording vessel; and recording the time-migrated data on the seismic recording vessel.

2. A method as in claim 1 wherein said recording of the received data on the seismic recording vessel occurs during said applying of time migration.

3. A method as in claim 1 wherein said time migration comprises f–k migration.

4. A method as in claim 1 wherein said time migration comprises Kirchhoff summation.

5. A method as in claim 1 wherein said time migration comprises single pass migration.

6. A method as in claim 1 wherein said time migration comprises multiple pass migration.

7. A method as in claim 1 further comprising stacking the time migrated data.

8. A method as in claim 1 wherein said migration comprises migration with a velocity known to be less than the velocity at a depth of interest.

9. A method as in claim 8 wherein said migration comprises migration with a water velocity.

10. A method as in claim 8 wherein said migration comprises migration with a near-surface velocity.

11. A method as in claim 1 further comprising transporting of the recorded received data and the recorded time-migrated data from the seismic recording vessel to a processing location and preparing a seismic section based on the time-migrated data.

12. A method as in claim 11 wherein said preparing was further based on said recorded data.

13. A method for acquiring marine seismic data comprising:

receiving data on a seismic recording vessel, whereby a set of received data is defined;

applying time migration to the received data on the seismic recording vessel, whereby a time-migrated set of data is defined;

detecting an unacceptable portion of the time-migrated data.

14. A method as in claim 13 wherein said detecting comprises displaying the time migrated set of data in a human-observable form and receiving instructions from an observer reviewing the display.

15. A method as in claim 13 wherein said detecting comprises comparing the data to a set of attribute parameters and marking portions of the data outside of the attribute parameters.

16. A method as in claim 13 wherein said attribute parameters are selected from a group consisting of amplitude, residual moveout on the gather, water depth, reflector fold and in-fill requirements, offset azimuth coverage, and illumination coverage.

17. A method as in claim 13 further comprising re-acquiring data corresponding to geographic locations represented by unacceptable portions of the time migrated data and substitution of the re-acquired data in the recorded received data for the unacceptable data.

18. A system for processing marine 3D seismic data, the system comprising:
   means for receiving data on a seismic recording vessel, whereby a set of received data is defined;
   means for applying time migration to the received data on the seismic recording vessel, whereby a time-migrated set of data is defined;
   means for recording the received data on the seismic recording vessel; and
   means for recording the time-migrated data on the seismic recording vessel.

19. A system as in claim 18 wherein said means for recording of the received data on the seismic recording vessel records the received data during said applying of time migration.

20. A system as in claim 18 wherein said means for applying time migration comprises means for applying f–k migration.

21. A system as in claim 18 wherein said means for applying time migration comprises means for applying Kirchhoff summation.

22. A system as in claim 18 wherein said means for applying time migration comprises single pass migration.

23. A system as in claim 18 wherein said means for applying time migration comprises multiple pass migration.

24. A system as in claim 18 further comprising means for stacking the time migrated data.

25. A system as in claim 18 wherein said means for applying time migration comprises a means for applying time migration with a velocity known to be less than the velocity at a depth of interest.

26. A system as in claim 25 wherein said means for applying time migration comprises a means for applying time migration with a water velocity.

27. A system as in claim 25 wherein said means for applying time migration comprises means for applying time migration with a near-surface velocity.

28. A system as in claim 18 further comprising
   means for transporting of the recorded received data and the recorded time-migrated data from the seismic recording vessel to a processing location and
   means for preparing a seismic section based on the time-migrated data.

29. A system as in claim 28 wherein said means for preparing is further based on said recorded data.

30. A system for acquiring marine seismic data comprising:
   means for receiving data on a seismic recording vessel, whereby a set of received data is defined;
   means for applying time migration to the received data on the seismic recording vessel, whereby a time-migrated set of data is defined;
   means for detecting an unacceptable portion of the time-migrated data.

31. A system as in claim 30 wherein said means for detecting comprises a means for displaying the time migrated set of data in a human-observable form and means for receiving instructions from an observer reviewing the display.

32. A system as in claim 30 wherein said means for detecting comprises means for comparing the data to a set of attribute parameters and means for marking portions of the data outside of the attribute parameters.

33. A system for processing marine 3D seismic data, the system comprising:
   a recording unit on a seismic recording vessel connected to a cable, the cable including seismic receivers, whereby a set of received data is defined;
   a computer for applying time migration to the received data on the seismic recording vessel, whereby a time-migrated set of data is defined;
   memory for storing the received data on the seismic recording vessel; and
   memory for recording the time-migrated data on the seismic recording vessel.

34. A system as in claim 33 wherein said cable comprises a towable streamer.

35. A system as in claim 33 wherein said cable comprises an ocean bottom cable.

36. A system as in claim 33 wherein said ocean bottom cable comprises at least two sensors at each receiver location.

37. A system as in claim 33 wherein at least one of said at least two sensors comprises a particle velocity detector.

38. A system as in claim 33 wherein at least one of said at least two sensors comprises a pressure detector.

39. A system as in claim 33 wherein said received data is stored in said memory for storing the received data during while the time migration is being applied to said data to generate the time-migrated set of data.

40. A system as in claim 33 wherein said computer applies the time migration by application of a factor from a stored table to the data, wherein the stored table represents f–k migration factors.

41. A system as in claim 33 wherein said computer applies the time migration by application of a factor from a stored table to the data, wherein the stored table represents Kirchhoff summation factors.

42. A system as in claim 33 wherein said computer applies single pass migration.

43. A system as in claim 33 wherein said computer applies multiple pass migration.

44. A system as in claim 33 wherein said computer applies the time migration by application of a factor from a stored table to the data, with a velocity known to be less than the velocity at a depth of interest.

45. A system as in claim 44 wherein said computer applies the time migration by application of a factor from a stored table to the data, with a water velocity.

46. A system as in claim 44 wherein said computer applies the time migration by application of a factor from a stored table to the data, with a near surface velocity.

47. A system for acquiring marine seismic data comprising:

a recording unit on a seismic recording vessel connected to a cable, the cable including seismic receivers, whereby a set of received data is defined;

a computer for applying time migration to the received data on the seismic recording vessel, whereby a time-migrated set of data is defined;

a detector of an unacceptable portion of the time-migrated data.

48. A system as in claim 47 wherein said detector comprises a display of the time migrated set of data in a human-observable form and input device for marking instructions from an observer reviewing the display.

49. A system as in claim 47 wherein said detector comprises a comparator of the data to a set of attribute parameters stored in the computer memory and marker of portions of the data outside of the attribute parameters.

50. A system as in claim 47 wherein said attribute parameters are selected from a group consisting of amplitude, residual moveout on the gather, water depth reflector fold and in-fill requirements, offset azimuth coverage, and illumination coverage.

* * * * *

UNITED STATES PATENT AND TRADEMARK OFFICE
CERTIFICATE OF CORRECTION

PATENT NO. : 5,930,731
DATED : July 27, 1999
INVENTOR(S) : Matthew A. Brzostowski It is certified that error appears in the above-identified patent and that said Letters Patent is hereby corrected as shown below:

Column 5, line 49, the word "moths" should read --months--

Column 5, line 36, after the word "that" insert -- in --,

Column 5, line 37, after the word "figures" delete "that."

Signed and Sealed this

Twenty-fifth Day of January, 2000

Attest:

Attesting Officer

*Acting Commissioner of Patents and Trademarks*